United States Patent [19]

Kennedy et al.

[11] Patent Number: 4,812,825
[45] Date of Patent: Mar. 14, 1989

[54] TORNADO WARNING SYSTEM

[75] Inventors: Richard E. Kennedy, Mt. Vernon; Earl R. Fredrich, Boonville, both of Mo.

[73] Assignee: K Electronics, Inc., Pierce City, Mo.

[21] Appl. No.: 13,037

[22] Filed: Feb. 10, 1987

[51] Int. Cl.$^4$ .............................................. G08B 21/00
[52] U.S. Cl. ................................... 340/601; 73/170 R
[58] Field of Search ...................... 340/626, 600, 601; 73/170 R; 324/72, 77 R, 79 D, 77 B; 342/26, 133, 89, 98, 107

[56] References Cited

U.S. PATENT DOCUMENTS

| | | | |
|---|---|---|---|
| 3,646,540 | 2/1972 | Cooper | 340/601 |
| 3,717,861 | 2/1973 | Wright, Jr. | 73/170 |
| 3,753,117 | 8/1973 | Downing | 73/170 R |
| 3,790,884 | 2/1974 | Kohl | 73/170 R |
| 3,810,137 | 5/1974 | Bacon, Jr. et al. | 340/601 |
| 4,115,732 | 9/1978 | Krider | 324/72 |
| 4,175,254 | 11/1979 | Manfreda | 324/79 D |
| 4,219,804 | 8/1980 | Weischedel | 340/601 |

OTHER PUBLICATIONS

"The Picnicker's Friend" J. E. Shepler; Popular Electronics, Jul. 1969.

Primary Examiner—Joseph A. Orsino
Assistant Examiner—Jill D. Jackson
Attorney, Agent, or Firm—Kerkam, Stowell, Kondracki & Clarke

[57] ABSTRACT

A tornado warning system uses a superhetrodyne receiver to detect electromagnetic energy produced by a tornado. The automatic gain control signal of the receiver is used to generate an intermediate signal having a time duration corresponding to the time when the automatic gain control is at or above a predetermined level. The intermediate signal is of constant amplitude and is integrated. Upon the integration reaching a predetermined level, an alarm initiate signal is produced which turns on an alarm drive and, in turn, sounds an alarm.

20 Claims, 3 Drawing Sheets

TORNADO WARNING SYSTEM

BACKGROUND OF THE INVENTION

This invention relates to tornado warning systems. More specifically, it relates to a tornado warning system which senses electromagnetic signals produced by tornados.

Tornados are a serious problem in many areas of the world. They often cause extensive property damage, serious injury, and even loss of life. Various devices and systems have been used in an attempt to detect tornados. If a detector warns a person about the approach of a tornado, the person may go to a basement or take other action to minimize the risk of injury or death.

Various tornado warning systems have been developed. Although the warning systems have provided varying degrees of usefulness, they are often subject to one or more of many disadvantages. One common disadvantage is the inability of some warning systems to distinguish between a tornado and a less severe storm. Depending upon the type of warning system, one must accept a relatively large of number of false positives (incorrect tornado warnings) in order to insure that the system will detect real tornados in a timely fashion. For example, a tornado warning system which uses a threshold arrangement requires that the threshold be set very carefully. If the threshold is set too low, a very brief severe moment in an otherwise moderate storm may falsely trigger the tornado alarm. On the other hand, if the threshold is set too high, the warning system may not detect a tornado or may detect it too late for evasive action. Some tornado warning systems are relatively unreliable, complex, expensive, and/or difficult to maintain in proper operation.

An example of a particular tornado warning device is that described in U.S. Pat. No. 3,810,137, issued to Bacon et al. on May 7, 1974. The Bacon patent discloses a tornado alarm which detects electromagnetic radiation generated by a tornado. A threshold detector is used to trigger an audible alarm and a warning light.

SUMMARY OF THE INVENTION

It is a primary object of the present invention to provide a new and improved tornado warning system.

A more specific object of the present invention is to provide a tornado warning system which is highly reliable.

Another object of the present invention is to provide a tornado warning system which is relatively simple and inexpensive in construction and operation.

Yet another object of the present invention is to provide a warning system which can be easily calibrated for proper operation.

Yet another object of the present invention is to avoid or minimize the disadvantages associated with prior art tornado warning systems as discussed above.

The above and other objects of the present invention which will become apparent as the description proceeds are realized by a tornado warning system comprising: a receiver operable to receive an amplitude modulated electromagnetic signal produced by a tornado within the frequency range of 1 Mhz to 100 Mhz and operable to provide an activity signal dependent on the electromagnetic signal; an alarm initiate circuit operably connected to respond to the activity signal and operable to produce an alarm initiate signal only after the occurrence of the activity signal for a given time period longer than 3 seconds; and an alarm operable to turn on responsive to the alarm initiate signal. Preferably, the alarm initiate circuit is operable to produce an alarm initiate signal only after the occurrence of the activity signal for a give time period longer than 10 seconds and, more specifically, longer than 25 seconds. The system further comprises a proximity circuit receiving the activity signal and causing a sensory output to vary with the magnitude of the activity signal such that the sensory output is indicative of the proximity of a possible tornado. The proximity circuit includes a visual display and the sensory output is shown on the display. The alarm initiate circuit includes an integrator and the alarm initiate corresponds to an output of the integrator reaching a predetermined level. The alarm initiate circuit produces an intermediate signal having the same duration as the activity signal and a constant amplitude. The integrator takes the integral of the intermediate signal. The activity signal is an automatic gain control signal from the receiver.

The invention may alternately be described as a tornado warning system comprising: a receiver operable to receive an amplitude modulated electromagnetic signal produced by a tornado within the frequency range of 1 Mhz to 100 Mhz and operable to provide an activity signal dependent on the electromagnetic signal, the activity signal being an automatic gain control signal from the receiver; an alarm initiate circuit operably connected to respond to the activity signal and operable to produce an alarm initiate signal; and an alarm operable to turn on responsive to the alarm initiate signal. The receiver is preferably a superheterodyne receiver.

The invention may alternately be described as a tornado warning system comprising: a receiver operable to receive an amplitude modulated electromagnetic signal produced by a tornado within the frequency range of 1 Mhz to 100 Mhz and operable to provide an activity signal dependent on the electromagnetic signal; an alarm initiate circuit operably connected to respond to the activity signal by producing an alarm initiate signal, the alarm initiate circuit also producing an intermediate signal having the same duration as the activity signal and a constant amplitude, the alarm initiate circuit taking an integral of the intermediate signal and producing an alarm initiate signal only after the integral of the intermediate signal has reached a predetermined level; and an alarm responsive to the alarm initiate signal.

BRIEF DESCRIPTION OF THE DRAWINGS

The above and other features of this invention will be more readily understood when the following detailed description is considered in conjunction with the accompanying drawings wherein like characters represent like parts throughout the several views and in which.

DETAILED DESCRIPTION

Figure 1:
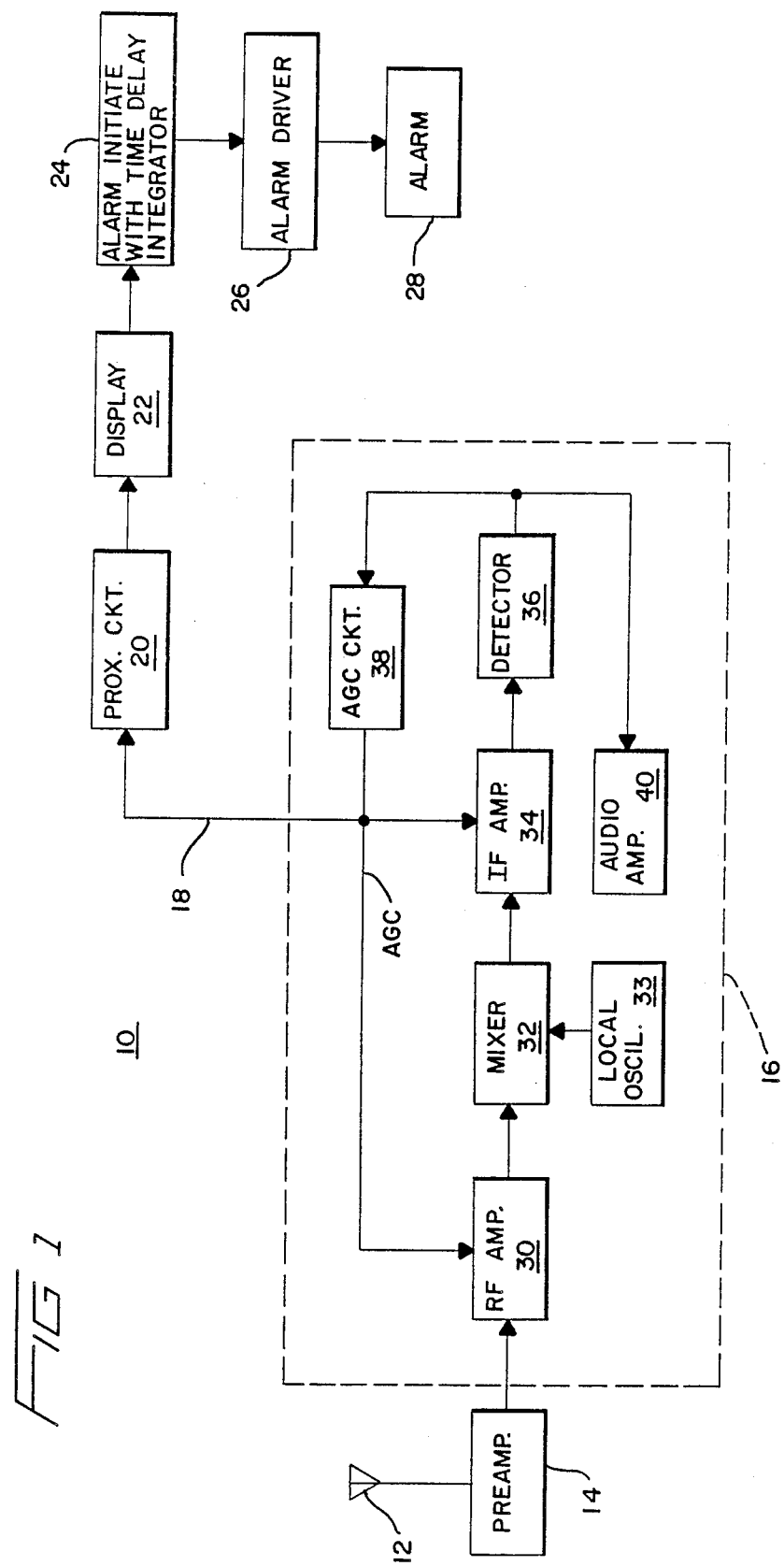
FIG. 1 shows a block diagram of the present invention.

FIG. 1 shows a block diagram of a tornado warning system 10 according to the present invention. Preferably, all of the components shown in FIG. 1 would be disposed within a common housing (not shown) with the possible exception of the antenna 12. The antenna 12, which may be a directional and steerable antenna, could be connected to the housing by a plug (not shown).

The antenna 12 supplies radio frequency signals to a preamplifier 14. The preamplifier 14 supplies its output to a receiver 16 which supplies an automatic gain control (AGC) signal on line 18 to a proximity circuit 20. The details of the components within receiver 16 will be discussed in detail below, but it should presently be noted that the AGC signal on line 18 is an activity signal whenever it obtains a predetermined level corresponding to the receiver 16 detecting the possible presence of a tornado by virtue of electromagnetic energy within a frequency range of the receiver. The frequency range will be somewhere within 1 Mhz to 100 Mhz. More specifically, the frequency range will preferably be from 1 Mhz to 60 Mhz and, even more specifically, within 5 Mhz of 50 Mhz. The occurrence of an activity signal on line 18 corresponding to high electromagnetic energy within the given frequency range of receiver 16 indicates a possible tornado within a 10 mile range. However, the activity signal may correspond to a momentary burst of energy in a storm which is not a tornado. The activity signal provided on line 18 is processed by the remainder of the circuit to distinguish between the momentary burst of energy associated with a non-tornado type storm and the continuous amplitude modulated signal associated with a tornado.

The activity signal provided on line 18 is supplied to the proximity circuit 20. The proximity circuit 20 controls a display 22 which illustrates the magnitude of the activity signal. In other words, the display 22 will illustrate the magnitude of electromagnetic energy within the range of receiver 16, this being indicative of the proximity (and possibly the strength) of a tornado.

The display 22 is connected to an alarm initiate circuit 24. The alarm initiate circuit includes a time delay/integrator which is highly efficient in distinguishing between a continuous amplitude modulated signal associated with a tornado and discontinuous or burst electromagnetic energy associated with lightning. If the alarm initiate circuit detects a tornado, it supplies an alarm initiate signal to an alarm driver 26. The alarm driver 26 turns on an alarm 28 upon the detection of the tornado.

The receiver 16 is preferably a superheterodyne receiver including a radio frequency amplifier 30, mixer 32, local oscillator 33, intermediate frequency amplifier 34, detector 36, and AGC circuit 38. If the receiver 16 is obtained as a unit, it may also include an audio amplifier 40. However, the tornado warning system 10 of FIG. 1 uses the AGC signal on line 18, instead of any audio output, to indicate the possible presence of a tornado. The AGC circuit 38 may include a filter and a share components or be connected to, the local oscillator 33 in which case it would include a filter to prevent the AGC signal from varying with the audio frequency. As will be readily understood by those of skill in the art, the AGC signal is used to control the gain of a receiver (in this case by controlling the gain of amplifiers 30 and 34) such that the output of one or more stages of the receiver remains fairly constant despite changes in the signal strength at the antenna. Because the warning system 10 operates on the AGC signal, any large radio frequency activity around the receiver frequency may cause the alarm 28 to sound after an appropriate delay determined by the alarm initiate circuit 24.

Figure 2:
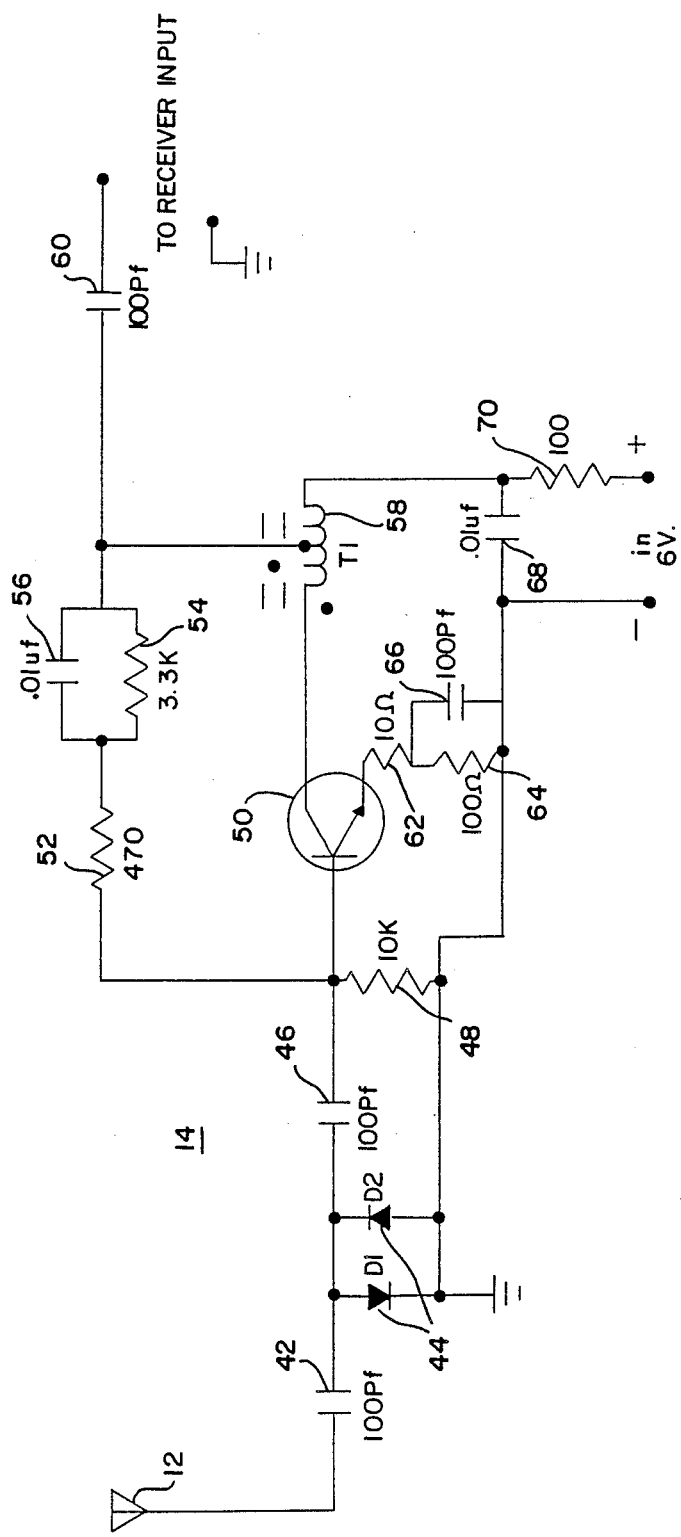
FIG. 2 shows a schematic of a preamplifier used with the present invention.

FIG. 2 shows a specific embodiment for a preamplifier 14 connected to antenna 12. Although various component values have been shown in FIG. 2 (and in FIG. 3 discussed below) variations in the component values may readily be used by one of skill in the art. The preamplifier 14 will be only briefly discussed, it being noted that it represents a relatively well known configuration for a preamplifier.

The preamplifier 14 includes input isolation capacitor 42, reverse parallel connected diodes 44 to shunt any large input signals, capacitor 46, and resistor 48. A transistor 50 is used to provide wide band amplification and has resistors 52 and 54, and capacitor 56 connected between its collector and its base. A ferrite tuned coil 58 is used to provide impedance matching with the receiver by way of coupling capacitor 60. Resistors 62, 64, and capacitor 66 are connected in circuit with the emitter of the transistor 50, whereas capacitor 68 and resistor 70 are connected in circuit with the transistor 50 and a 6 volt power supply (not shown).

Figure 3:
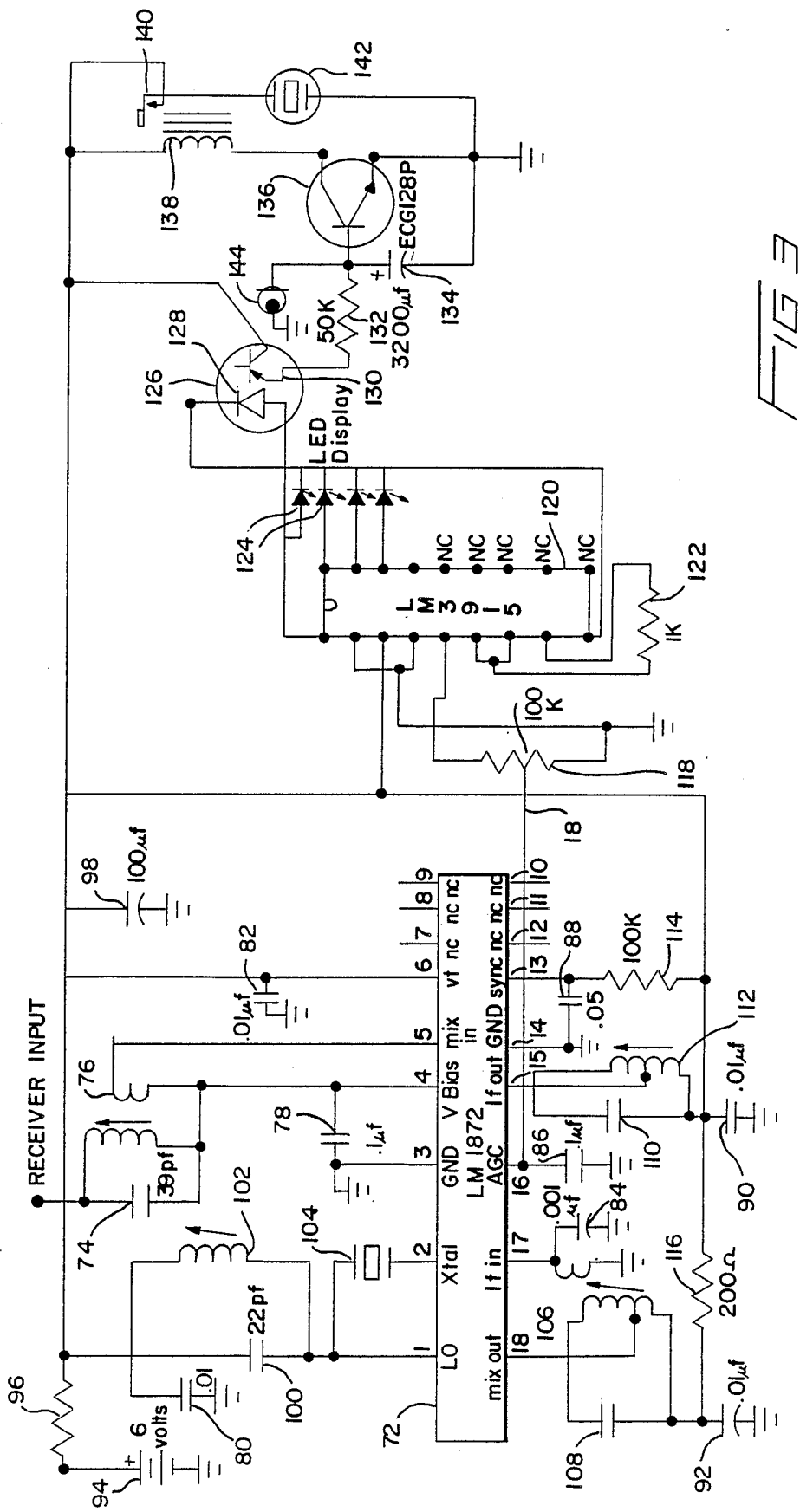
FIG. 3 shows a schematic of the present invention.

FIG. 3 shows the components of the system 10 except for the antenna and preamplifier.

An integrator circuit receiver chip 72, which may be the commercially available chip LM1872, is used for receiving the electromagnetic energy. In particular, a tuned circuit, including capacitor 74 and input transformer 76, is used at the input to the chip. Bypass capacitor 78, as well as other bypass capacitors 80, 82, 84, 86, 88, 90, and 92, are used to provide a bypass to ground in order to maintain receiver stability. A battery 94 is disposed in the circuit to provide power by way of power supply decoupling resistor 96. Capacitor 98 provides decoupling to the power supply input to stabilize the receiver from variation in receiver load.

Capacitor 100 and coil 102 serve as a tank circuit for the local oscillator controlled by crystal 104. The crystal 104, operated in the third overtone parallel mode, has an actual frequency of 45 Khz less than 49.89 Mhz. As shown, the crystal 104 is connected to terminal 2 of the receiver chip 72. Additionally, the terminals 1-9 of chip 72 are shown from left to right at the top of chip 72, whereas the connections for terminals 10-18 of chip 72 are shown from right to left at the bottom of chip 72. Mixer coil 106 includes capacitor 108 as an integral part thereof, whereas capacitor 110 is an integral part of the intermediate frequency transformer 112. Resistor 114 serves to bias the synchronization control, whereas resistor 116 serves as a mixer decoupling resistor. An AGC output is provided on line 18, it being readily appreciated that the signal on this line is used internally to the chip to control the gain of one or more stages of the receiver.

The AGC line 18 extends from the integrated circuit chip 72 to a potentiometer 118 which, together with LED display driver integrated circuit chip 120 and range set resistor 122, serves a proximity circuit (20 in FIG. 1) for driving the LED displays 124 (collectively shown as display 22 in FIG. 1). The chip 120 lights a variable number of LEDs 124 depending upon the signal applied at line 18 to the potentiometer 118. During non-storm conditions, the wiper arm of potentiometer 118 should be set just below the value at which one of the LEDs 124 lights up. In other words, under normal conditions none of the LEDs 124 light up. Upon the AGC signal reaching a higher level corresponding to the occurrence of an activity signal on line 18, the display driver 120 will cause one or more of the LEDs to light up depending upon the magnitude of the AGC signal. The greater the magnitude, the more LEDs will be turned on. Although the lighting of the LEDs 124 indicates that the receiver is receiving electromagnetic signals indicative of a possible tornado, the lighting of one or more of the LEDs 124 could alternately correspond to a momentary burst of electromagnetic energy associated with a lightning storm.

In order to distinguish between momentary burst of electromagnetic energy and the continuous amplitude modulated signals corresponding to a tornado, an optical isolator 126 is used as part of an alarm initiate circuit (shown as 24 in block diagram of FIG. 1). The optical isolator 126 includes an LED 128 which generates a light output whenever the chip 120 drives it and a phototransistor 130 which closes upon the LED 128 emitting light. Closure of the phototransistor 130 causes an integrator comprised of resistor 132 and charging capacitor 134 to begin integrating voltage supplied from the battery 94. The signal at the left side of resistor 132 may be considered as an intermediate signal which is derived from the activity signal on line 18 and has the same duration as the activity signal, but has a constant amplitude. The intermediate signal supplied to the left of resistor 132 causes the capacitor 134 to begin charging. Assuming that the activity signal on line 18 is a signal corresponding to a tornado such that the electromagnetic energy is relatively continuous, the capacitor 134 will charge up until it supplies an alarm initiate signal at its upper end. In particular, the voltage across the capacitor will become an alarm initiate signal upon it reaching sufficient voltage to turn on a transistor 136 serving as alarm driver. Upon the transistor 136 being turned on, the relay coil 138 is energized and causes closure of the normally open relay contacts 140. Closure of the relay contacts 140 will energize the alarm 142 and, thereby, warn of the tornado. One may then view the LED displays 124 to determine how close the tornado likely is. Upon the LEDs 124 being turned off corresponding to a low automatic gain control level on line 18 (and thus a low amount of electromagnetic energy within the receiver frequency range), one may reset the alarm 142 and discharge the capacitor 134 by pressing a momentary reset switch 144.

It should be appreciated that the optical isolator 126 guards against the alarm 142 going off in the absence of a tornado. In particular, the occurrence of a momentary burst of electromagnetic energy within the receiver range may cause temporary closure of the phototransistor 130, but the time delay provided by the resistor 132 and capacitor 134 prevents such a momentary burst from closing transistor 136 and operating the alarm 142. Instead, the transistor 130 must remain closed for sufficient time to allow the capacitor 134 to charge up to a sufficient magnitude to close the transistor 136. The time delay or charging time before capacitor 134 will close transistor 136 should be at least 3 seconds. It is highly preferred that the time delay be at least 10 seconds and it is even more preferable that the time delay be at least 30 seconds. Use of a 30 second or more time delay is highly advantageous in preventing the false indication of a tornado.

Although various specific constructions have been described herein, it is to be understood that these are for illustrative purposes. Various modifications and adaptations will be readily apparent to those of skill in the art. Accordingly, the scope of the present invention should be determined by reference to the claims appended hereto.

What is claimed is:

1. A tornado warning system comprising:
   a receiver operable to receive an amplitude modulated electromagnetic signal produced by a tornado within a frequency range within 1 Mhz to 100 Mhz and operable to provide an activity signal dependent on said electromagnetic signal;
   an alarm initiate circuit operably connected to respond to said activity signal and operable to produce an alarm initiate signal only after the occurrence of said activity signal for a given time period longer than 10 seconds;
   an alarm operable to turn on responsive to said alarm initiate signal; and
   wherein said activity signal is an automatic gain control signal from said receiver.

2. The tornado warning system of claim 1 wherein said alarm initiate circuit is operable to produce an alarm initiate signal only after the occurrence of said activity signal for a given time period longer than 25 seconds.

3. The tornado warning system of claim 1 further comprising a proximity circuit receiving said activity signal and causing a sensory output to vary with the magnitude of said activity signal such that said sensory output is indicative of the proximity of a possible tornado.

4. The tornado warning system of claim 3 wherein said proximity circuit includes a visual display and said sensory output is shown on said visual display.

5. The tornado warning system of claim 1 wherein said alarm initiate circuit includes an integrator and said alarm initiate signal corresponds to an output of said integrator reaching a predetermined level.

6. The tornado warning system of claim 5 wherein said alarm initiate circuit produces an intermediate signal having the same duration as said activity signal and a constant amplitude, and wherein said integrator takes the integral of said intermediate signal.

7. The tornado warning system of claim 1 wherein said receiver is a superheterodyne receiver.

8. A tornado warning system comprising:
   a receiver operable to receive an amplitude modulated electromagnetic signal produced by a tornado a frequency range within 1 Mhz to 100 Mhz and operable to provide an activity signal dependent on said electromagnetic signal, said activity signal being an automatic gain control signal from the receiver;
   an alarm initiate circuit operably connected to respond to said activity signal and operable to produce an alarm initiate signal; and
   an alarm operable to turn on responsive to said alarm initiate signal.

9. The tornado warning system of claim 8 wherein said receiver is a superheterodyne receiver and wherein said alarm initiate circuit is operable to produce an alarm initiate circuit only after the occurrence of said activity signal for a given time period longer than 3 seconds.

10. The tornado warning system of claim 8 further comprising a proximity circuit receiving said activity signal and causing a sensory output to vary with the magnitude of said activity signal such that said sensory output is indicative of the proximity of a possible tornado, and wherein said proximity circuit includes a visual display and said sensory output is shown on said visual display.

11. The tornado warning system of claim 8 wherein said alarm initiate circuit includes an integrator and said alarm initiate signal corresponds to an output of said integrator reaching a predetermined level.

12. The tornado warning system of claim 11 wherein said alarm initiate circuit produces an intermediate signal having the same duration as said activity signal and a constant amplitude, and wherein said integrator takes the integral of said intermediate signal.

13. The tornado warning system of claim 12 wherein said alarm initiate circuit is operable to produce an alarm initiate signal only after the occurrence of said activity signal for a given time period longer than 3 seconds.

14. A tornado warning system comprising:
a receiver operable to receive an amplitude modulated electromagnetic signal produced by a tornado within a frequency range within 1 Mhz to 100 Mhz and operable to provide an activity signal dependent on said electromagnetic signal;
an alarm initiate circuit operably connected to respond to said activity signal by producing an alarm initiate signal, said alarm initiate circuit also producing an intermediate signal having the same duration as said activity signal and a constant amplitude, said alarm initiate circuit taking an integral of said intermediate signal and producing said alarm initiate signal only after said integral of said intermediate signal has reached a predetermined level; and an alarm operable to turn on responsive to said alarm initiate signal.

15. The tornado warning system of claim 14 further comprising a proximity circuit receiving said activity signal and causing a sensory output to vary with the magnitude of said activity signal such that said sensory output is indicative of the proximity of a possible tornado.

16. The tornado warning system of claim 15 wherein said alarm initiate circuit is operable to produce an alarm initiate signal only after the occurrence of said activity signal for a given time period longer than 3 seconds.

17. The tornado warning system of claim 16 wherein said activity signal is an automatic gain control signal from said receiver.

18. The tornado warning system of claim 17 wherein said proximity circuit includes a visual display and said sensory output is shown on said visual display.

19. The tornado warning system of claim 1 wherein said receiver includes a detector having a detector output, an automatic gain control circuit connected to said detector output and operable to generate said activity signal, and at least one amplifier, and wherein said automatic gain control circuit is connected to supply said activity signal to said at least one amplifier for controlling the gain of said at least one amplifier.

20. The tornado warning system of claim 8 wherein said receiver includes a detector having a detector output, an automatic gain control circuit connected to said detector output and operable to generate said activity signal, and at least one amplifier, and wherein said automatic gain control circuit is connected to supply said activity signal to said at least one amplifier for controlling the gain of said at least one amplifier.

* * * * *